(12) United States Patent
Cao et al.

(10) Patent No.: US 7,935,223 B2
(45) Date of Patent: May 3, 2011

(54) PANELS INCLUDING RENEWABLE COMPONENTS AND METHODS FOR MANUFACTURING

(75) Inventors: Bangji Cao, Naperville, IL (US); Te Hua Lau, Glenview, IL (US); Curt Malone, Naperville, IL (US); W. David Song, Lake Forest, IL (US); Martin W. Brown, Gurnee, IL (US)

(73) Assignee: ISG Interiors, Inc., Chicago, IL (US)

( * ) Notice: Subject to any disclaimer, the term of this patent is extended or adjusted under 35 U.S.C. 154(b) by 368 days.

(21) Appl. No.: 12/106,077

(22) Filed: Apr. 18, 2008

(65) Prior Publication Data

US 2009/0260770 A1    Oct. 22, 2009

(51) Int. Cl.
*D21F 11/00* (2006.01)

(52) U.S. Cl. .......................... 162/202; 264/112; 442/71

(58) Field of Classification Search ................. 162/202; 442/71, 136, 140, 141; 264/112, 129
See application file for complete search history.

(56) References Cited

U.S. PATENT DOCUMENTS

| | | |
|---|---|---|
| 659,942 A | 10/1900 | Thatcher |
| 764,849 A | 7/1904 | Hubbard |
| 1,769,519 A | 7/1930 | King et al. |
| 1,960,372 A | 5/1934 | Davey |
| 1,968,489 A | 7/1934 | Jenkins |
| 1,983,022 A | 12/1934 | Eston et al. |
| 3,519,450 A | 7/1970 | Polis |
| 3,830,903 A | 8/1974 | Robinsky et al. |
| 4,366,096 A | 12/1982 | Abrams et al. |
| 4,746,688 A | 5/1988 | Bistak et al. |
| 5,071,511 A | 12/1991 | Pittman |
| 5,656,129 A | 8/1997 | Good et al. |
| 5,905,234 A | 5/1999 | Tsukamoto et al. |
| 6,443,257 B1 | 9/2002 | Wiker et al. |
| 6,443,258 B1 | 9/2002 | Putt et al. |
| 6,616,804 B2 | 9/2003 | Foster et al. |
| 6,780,356 B1 | 8/2004 | Putt et al. |
| 2002/0162298 A1 | 11/2002 | Churchill et al. |
| 2004/0048531 A1 | 3/2004 | Belmares et al. |
| 2006/0070321 A1 | 4/2006 | Au |
| 2006/0182940 A1* | 8/2006 | Cline .................. 428/292.1 |
| 2006/0252323 A1* | 11/2006 | Cline ......................... 442/71 |
| 2007/0042658 A1* | 2/2007 | Cline et al. ................ 442/136 |
| 2008/0020961 A1 | 1/2008 | Rodriques et al. |

FOREIGN PATENT DOCUMENTS

| | | |
|---|---|---|
| EP | 49733 A1 | 8/1981 |
| EP | 0 808 953 | 11/1997 |
| JP | 54063514 | 5/1979 |
| JP | 58072441 | 4/1983 |

OTHER PUBLICATIONS

Indian Institute of Technology Project Proposal, "Development of Sound Proofing Composite Materials Using Jute Products", Sep. 2007, pp. 1-18; Sep. 2007.
Armstrong, "See What's Growing", pp. 1-7, http://www.armstrong.com/common/c2002/content/files/51053.pdf.

* cited by examiner

*Primary Examiner* — Mark Halpern
(74) *Attorney, Agent, or Firm* — Greer, Burns & Crain, Ltd.; Pradip Sahu, Esq.; Philip T. Petti, Esq.

(57) ABSTRACT

A panel includes about 0.1% to about 95% by weight of a renewable component. The panel has at least one of a CAC value of at least about 25, an NRC value of at least about 0.25 and an STC of at least about 25. A method for manufacturing such panels is also provided.

15 Claims, No Drawings

PANELS INCLUDING RENEWABLE COMPONENTS AND METHODS FOR MANUFACTURING

FIELD OF THE INVENTION

The present invention relates to panels for the building industry that include a renewable component to improve acoustic and physical properties of the panel. Methods of making such panels are also provided.

BACKGROUND

Panels used as tiles or walls fall into the category of building products and provide architectural value, acoustical absorbency, acoustical attenuation and utility functions to building interiors. Commonly, panels, such as acoustical panels, are used in areas that require noise control. Examples of these areas are office buildings, department stores, hospitals, hotels, auditoriums, airports, restaurants, libraries, classrooms, theaters, and cinemas, as well as residential buildings.

To provide architectural value and utility functions, an acoustical panel, for example, is substantially flat and self-supporting for suspension in a typical ceiling grid system or similar structure. Thus, acoustical panels possess a certain level of hardness and rigidity, which is often measured by its modulus of rupture ("MOR"). To obtain desired acoustical characteristics, an acoustical panel also possesses sound absorption, as well as transmission reduction properties.

Sound absorption is typically measured by its Noise Reduction Coefficient ("NRC") as described in ASTM C423. NRC is represented by a number between 0 and 1.00, which indicates the fraction of sound reaching it that is absorbed. An acoustical panel with an NRC value of 0.60 absorbs 60% of the sound that strikes it and deflects 40% of the sound. Another test method is estimated NRC ("eNRC"), which uses an impedance tube as described in ASTM C384.

The ability to reduce sound transmission is measured by the values of Ceiling Attenuation Class ("CAC") as described in ASTM E1414. CAC value is measured in decibels ("dB"), and represents the amount of sound reduction when sound is transmitted through the material. For example, an acoustical panel with a CAC of 40 reduces transmitted sound by 40 decibels. Similarly, sound transmission reduction can also be measured by its Sound Transmission Class ("STC") as described in ASTM E413 and E90. For example, a panel with an STC value of 40 reduces transmitted sound by 40 decibels.

Acoustical panels made in accordance with various industry standards and building codes have a Class A fire rating. According to ASTM E84, a flame spread index less than 25 and a smoke development index less than 50 are required. Airflow resistivity, a measurement of the porosity of a mat, is tested according to modified ASTM C423 and C386 standards. In addition, MOR, hardness and sag of acoustical panels are tested according to ASTM C367. Increased porosity of a base mat improves acoustical absorbency, but it is not measured by any specific industry standard or building code.

Currently, most acoustical panels or tiles are made using a water-felting process preferred in the art due to its speed and efficiency. In a water-felting process, the base mat is formed utilizing a method similar to papermaking. One version of this process is described in U.S. Pat. No. 5,911,818 issued to Baig, herein incorporated by reference. Initially, an aqueous slurry including a dilute aqueous dispersion of mineral wool and a lightweight aggregate, is delivered onto a moving foraminous wire of a Fourdrinier-type mat forming machine. Water is drained by gravity from the slurry and then optionally further dewatered by means of vacuum suction and/or by pressing. Next, the dewatered base mat, which may still hold some water, is dried in a heated oven or kiln to remove the residual moisture. Panels of acceptable size, appearance and acoustic properties are obtained by finishing the dried base mat. Finishing includes surface grinding, cuffing, perforation/fissuring, roll/spray coating, edge cutting and/or laminating the panel onto a scrim or screen.

A typical acoustical panel base mat composition includes inorganic fibers, cellulosic fibers, binders and fillers. As is known in the industry, inorganic fibers can be either mineral wool (which is interchangeable with slag wool, rock wool and stone wool) or fiberglass. Mineral wool is formed by first melting slag or rock wool at 1300° C. (2372° F.) to 1650° C. (3002° F.). The molten mineral is then spun into wool in a fiberizing spinner via a continuous air stream. Inorganic fibers are stiff, giving the base mat bulk and porosity. Conversely, cellulosic fibers act as structural elements, providing both wet and dry base mat strength. The strength is due to the formation of countless hydrogen bonds with various ingredients in the base mat, which is a result of the hydrophilic nature of the cellulosic fibers.

A typical base mat binder used is starch. Typical starches used in acoustical panels are unmodified, uncooked starch granules that are dispersed in an aqueous panel slurry and distributed generally uniformly in the base mat. Once heated, the starch granules become cooked and dissolve, providing binding ability to the panel ingredients. Starches not only assist in the flexural strength of the acoustical panels, but also for hardness and rigidity of the panel. In certain panel compositions having a high concentration of inorganic fibers, a latex binder is used as the primary binding agent.

Typical base mat fillers include both heavyweight and lightweight inorganic materials. A primary function of the filler is to provide flexural strength and contribute to hardness of the panel. Even though the term "filler" is used throughout this disclosure, it is to be understood that each filler has unique properties and/or characteristics that can influence the rigidity, hardness, sag, sound absorption and reduction in the sound transmission in panels. Examples of heavyweight fillers include calcium carbonate, clay or gypsum. An example of a lightweight filler includes expanded perlite. As a filler, expanded perlite has the advantage of being bulky, thereby reducing the amount of filler required in the base mat.

One disadvantage of expanded perlite is that the perlite particles tend to fill the pores in the base mat and seal its surface, which compromises the sound absorption capacity of the panel. Furthermore, expanded perlite is relatively fragile and frangible during the manufacturing process. In general, the greater the amount of expanded perlite used, the poorer the panel acoustic absorption properties. The expansion of perlite consumes a significant amount of energy. Expanded perlite is formed when perlite ore is introduced into an expanding tower that is heated to about 950° C. (1750° F.). Water in the perlite structure turns to steam and the resulting expansion causes the perlite to "pop" like popcorn to reduce the density to about one-tenth of the unexpanded material. The lower bulk density of expanded perlite enables it to flow upward in the expanding tower and be collected by a filtering device. This process uses a relatively large amount of energy to heat all of the perlite to a temperature sufficient to vaporize the water within it.

Given the current trends in the building industry, there is a desire for products which are environmentally friendly, i.e., made with processes that result in reduced global warming, acidification, smog, eutrophication of water, solid waste, primary energy consumption and/or water effluent discharge.

Naturally growing, renewable materials can be used to produce environmentally friendly building products. In the building industry, a widely used renewable material is lumber, but it provides little acoustical absorption. There is a large amount of agricultural waste and byproducts, as well as lumber and furniture industry waste that is readily available but has limited use in building materials production.

Cellulosic fibers are made by pulping ligno-cellulosic materials such as wood, straw, bamboo and others to break the plant material into its individual fiber cells either chemically or mechanically. A common chemical pulping method uses sodium sulfide, sodium hydroxide or sodium sulfite to dissolve the lignin at about 150° C. (302° F.) to about 180° C. (356° F.), reducing the fiber's biomass by about 40-60%. A thermal-mechanical pulping method subjects wood chips to high temperatures (about 130° C. (266° F.)) and high pressure (about 3-4 atmospheres (304-405 kPa)), causing the lignin to soften and allowing fiber cells to be mechanically torn apart. Disruption of the lignin bond causes the defiberization of the raw material with a resulting loss in its biomass of about 5-10%. Both chemical and thermal-mechanical pulping processes require significant amounts of energy to reduce the ligno-cellulosic material to its individual fibers. Further, the loss of such a large fraction of the biomass increases the cost of raw materials.

Several United States patents teach using renewable materials in building materials. U.S. Pat. No. 6,322,731 discloses a method for forming a structural panel of indefinite length, comprising an organic particulate base material consisting predominately of rice hulls and a binder. Due to the requirements for structural integrity, the process requires a combination of high temperature and high pressure to form a panel of sufficient strength. The resultant panel has relatively low sound absorption value, due to its high density and low porosity. The thermal and acoustic insulation characteristics are achieved through the encased cavities.

U.S. Pat. No. 5,851,281 discloses a process for manufacturing a cement-waste material composite where the waste material is rice husks. The rice husks are heated to approximately 600° C. (1112° F.) in the absence of oxygen to produce micro-granules.

U.S. Pat. No. 6,443,258 discloses an acoustically absorbent porous panel formed from a cured, aqueous, foamed, cementitious material. The panel provides good acoustical performance with enhanced durability and moisture resistance. Rice hull ash is added to enhance the overall hardness of the foamed cement panel.

SUMMARY OF THE INVENTION

A panel is provided for use as a building material having improved acoustic and physical properties. The present panels include a renewable component, such as rice hulls and have improved acoustic properties, including maintaining a relatively constant CAC or STC. In addition, an improved NRC is achieved while maintaining or improving other physical properties of the panel, including the MOR, hardness, air-flow resistivity and sag.

In one embodiment, the present panel includes about 0.1% to about 95% by weight of a renewable component. The panel has at least one of a CAC value of at least about 25, an NRC value of at least about 0.25 and an STC value of at least about 25.

In another embodiment, a method for the production of a panel for use as a building material includes the steps of forming an aqueous slurry that includes from about 0.1% to about 95% of the renewable component and water. A base mat is then formed from the slurry using a foraminous wire. The water from the base mat is removed and the base mat is finished to form a panel for use as a building material. The panel made by this method has at least one of a CAC value of at least about 25 and an NRC value of at least about 0.25.

The addition of a ground or milled renewable component is advantageous since preparation of the renewable component requires less energy than other filler materials. It is preferred that the renewable component is ground or directly incorporated into acoustical panels. Energy is consumed in this process only if the renewable component is ground and/or sieved, using less energy compared to expanding perlite.

Another advantage of using a renewable material is that it is prepared without significant loss in biomass. The ground or milled renewable material maintains its bulk structure and is not subjected to chemical modification or changes in chemical structure, such as defiberizing. Retention of the biomass results in more efficient use of the purchased raw materials, thereby reducing its cost.

Selection of a different filler to be used in a building panel often undesirably changes panel properties. However, use of the present renewable component reduces energy and raw material costs while maintaining or improving other physical properties of the panel.

DETAILED DESCRIPTION OF AN EMBODIMENT OF THE INVENTION

The product, method and composition described herein are intended to apply to panels for use as building materials. More specifically, the panels can also be used as ceiling panel products, acoustical panels or tiles. The following discussion is directed to an acoustical panel as one embodiment of the invention; however this is not intended to limit the invention in any way.

Fibers are present in the acoustical panel as inorganic fibers, organic fibers or combinations thereof. Inorganic fibers can be mineral wool, slag wool, rock wool, stone wool, fiberglass or mixtures thereof. The inorganic fibers are stiff, giving the base mat bulk and porosity. Inorganic fibers are present in the acoustical panel in amounts of about 0.1% to about 95%, based on the weight of the panel. At least one embodiment of the acoustical panel uses mineral wool as the preferred fiber. Cellulosic fibers, an example of an organic fiber, act as structural elements providing both wet and dry base mat strength. The strength is due to the formation of hydrogen bonds with various ingredients in the base mat, which is a result of the hydrophilic nature of the cellulosic fibers. Cellulosic fibers in the base mat range from about 1% to about 50% by weight of the panel, preferably about 5% to about 40% and most preferably from about 10% to about 30%. One preferred cellulosic fiber is derived from recycled newsprint.

The panels include at least one ingredient that is a renewable component. Renewable components are defined as wood or non-wood plants, or a portion of wood or non-wood plants. These renewable components are preferably ligno-cellulosic, which include cellulose and lignin. Potential sources of these materials are waste materials or byproducts from the farming industry, the agricultural industry, the forestry industry and/or the building industry.

Rice hulls or husks are examples of the renewable component. Examples of other renewable components include, but are not limited to: wheat chaff, oak husk, rye whisk, cotton seed hull, coconut shells, corn bran, corn cobs, ground rice straw stalk, ground wheat straw stalk, ground barley straw stalk, ground oat straw stalk, ground rye straw stalk, ground bagasse, ground reeds, ground Esparto, ground Sabai, ground flax, ground kenaf, ground jute, ground hemp, ground ramie, ground abaca, ground sisal, saw dust, ground bamboos, ground wood chips, sorghum stalks, sunflower seeds, etc.

The renewable components are preferably reduced in size prior to mixing with other panel ingredients. In some embodiments, the renewable component is used whole or as received from a supplier. Use of the term "renewable component" is intended to include particles that are whole or reduced in size by any method as is known in the art, including particles that are comminuted, such as shredded, ground, milled, sieved or combinations thereof. Size reduction is optionally achieved by mechanical processes, such as grinding or milling, to obtain the desired sizes. At least one embodiment uses hammer mill-type equipment. Chemical processes for size reduction are optionally used, but they are generally not preferred due to loss of biomass.

Optionally, renewable components can be sieved with screens of particular mesh sizes to obtain a desired particle size distribution. The coarse fraction that is too large to pass through the largest desired screen is optionally removed and re-processed until the resulting material passes through the screen. In one embodiment, the ground rice hulls are first sieved with a #30 mesh screen to remove large particles, followed by sieving through a #80 mesh screen to remove particles that are too fine. The processed hulls that pass the #30 mesh screen and are retained on the #80 mesh screen are used to make the acoustical panels. In this embodiment, the materials that pass through the #80 mesh screen are not used in the panels. The #30 mesh screen has an opening of 0.022 inches or 0.55 mm. The #80 mesh screen has an opening of 0.007 inches or 180 µm. In another embodiment, the processed hulls obtained directly from a rice milling plant are used to make acoustical panels.

As discussed in the Background, expanded perlite is a material that is often used in building panels. When used in ceiling panels, expanded perlite tends to form a structure that lacks inter-connected pores. Introducing a ground or milled renewable component into acoustical panels helps to interrupt the expanded perlite structure and thereby increases interconnected pores. Panels including ground or milled renewable components in addition to perlite are more porous and yield higher acoustical absorbency than panels having perlite without any ground or milled renewable components.

It has been observed that the larger the particle size of the renewable component, the higher the acoustical absorption value. The optimum particle size distribution for any one embodiment depends on the desired acoustical absorption value.

It should be appreciated that the renewable component particle size distribution is desirably compatible with other ingredients, such as fiber, expanded perlite and the like, to form a homogeneous and uniform slurry. Formation of a uniform slurry leads to production of homogeneous and uniform base mat. The particle size distribution is preferably chosen so as to maintain or improve the physical integrity of the panel.

In some embodiments, the renewable components include less than about 5% by weight of particles that are retained by a #6 mesh screen. In other embodiments, the renewable components used include less than about 5% of particles that are retained by a #20 mesh screen. In still other embodiments, the ground or milled renewable components used include less than about 5% of particles that are retained by a #30 mesh screen. Preferably, the renewable components have a bulk density between about 5 to about 50 lbs/ft$^3$ (80 to 800 kg/m$^3$), with a more preferred bulk density of about 10 to 40 lbs/ft$^3$ (160 to 640 kg/m$^3$) and a most preferred range of about 20 to about 35 lbs/ft$^3$ (320 to 560 kg/m$^3$). The #6 mesh screen has an opening of 0.132 inches or 3.35 mm, the #20 screen mesh has an opening of 0.0312 inches or 800 µm and the #30 screen mesh has an opening of 0.022 inches or 0.55 mm.

Starch is optionally included in the base mat as a binder. Typical starches are unmodified, uncooked starch granules that are dispersed in an aqueous slurry and become distributed generally uniformly through the base mat. The base mat is heated, cooking and dissolving the starch granules to bind the panel ingredients together. Starch not only assists in the flexural strength of the acoustical panels, but also improves the hardness and rigidity of the panel. In addition, the base mat optionally includes starches in the range of about 1% to about 30% by weight of the panel, more preferably from about 3% to about 15% and most preferably from about 5% to about 10%.

Typical base mat fillers include both lightweight and heavyweight inorganic materials. Examples of heavyweight fillers include calcium carbonate, clay or gypsum. Other fillers are also contemplated for use in the acoustical panels. In one embodiment, calcium carbonate in the range from about 0.5% to about 10% by weight of the panel is utilized. The calcium carbonate can also be used in the range of about 3% to about 8% by weight of the panel.

An example of a lightweight filler is expanded perlite. Expanded perlite is bulky, reducing the amount of filler used in the base mat. Primary functions of the filler are improved flexural strength and hardness of the panel. Even though the term "filler" is used throughout this discussion, it is to be understood that each filler has unique properties and/or characteristics that can influence the rigidity, hardness, sag, sound absorption and reduction in the sound transmission in panels. The expanded perlite in the base mat of this embodiment is present in amounts ranging from about 5% to about 80% by weight of the panel, more preferably about 10% to about 60% by weight of the panel and most preferably from about 20% to about 40% by weight of the panel.

In one preferred embodiment, the base mat includes a renewable component, mineral wool, expanded perlite, starch, calcium carbonate and/or clay. One of the preferred renewable components is rice hulls. The percentage of renewable component is in the range of about 0.1% to about 95% by weight of the panel, more preferably about 5% to about 60% and most preferably from about 7% to about 40%.

Another optional ingredient in the acoustical panel is clay, which is typically included to improve fire resistance. When exposed to fire, the clay does not burn; instead, it sinters. Acoustical panels optionally include from about 0% to about 10% clay by weight of the panel, with a preferred range of about 1% to about 5%. Many types of clay are used including but not limited to Spinks Clay and Ball Clay from Gleason, Tenn. and Old Hickory Clay from Hickory, Ky.

A flocculant is also optionally added to the acoustical panels. The flocculant is preferably used in the range of about 0.1% to about 3% by weight of the panel and more preferably from about 0.1% to about 2%. Useful flocculants include, but are not limited to, aluminum chlorohydrate, aluminum sulfate, calcium oxide, ferric chloride, ferrous sulfate, polyacrylamide, sodium aluminate and sodium silicate.

In one embodiment of making base mats for the acoustical panels, an aqueous slurry is preferably created by mixing water with the renewable component, mineral wool, expanded perlite, cellulosic fibers, starch, calcium carbonate, clay and flocculant. Mixing operations are preferably carried out in a stock chest, either in batch modes or in continuous modes. The amount of added water is such that the resultant total solid content or consistency is in the range of about 1% to about 8% consistency, preferably from about 2% to about 6% and more preferably from about 3% to about 5%.

Once a homogeneous slurry including the above-mentioned ingredients is formed, the slurry is transported to a headbox, which provides a steady flow of the slurry material.

The slurry flowing out of the headbox is distributed onto a moving foraminous wire to form the wet base mat. Water is first drained from the wire by gravity. It is contemplated that in certain embodiments, a low vacuum pressure may be used in combination with, or after draining water from the slurry by gravity. Additional water is then optionally removed by pressing and/or using vacuum-assisted water removal, as would be appreciated by those having ordinary skill in the art. The remainder of the water is typically evaporated in an oven or kiln to form the formed base mat.

Once formed, the base mats preferably have a bulk density between about 7 to about 30 lbs/ft$^3$ (112 to 480 kg/m$^3$), more preferably between about 8 to about 25 lbs/ft$^3$ (128 to 400 kg/m$^3$) and most preferably from about 9 to about 20 lbs/ft$^3$ (144 to 320 kg/m$^3$).

The formed base mat is then cut and converted into the acoustical panel through finishing operations well known by those having ordinary skill in the art. Some of the preferred finishing operations include, among others, surface grinding, coating, perforating, fissuring, edge detailing and/or packaging.

Perforating and fissuring contribute significantly to improving acoustical absorption value from the above-described base mats. Perforating operations provide multiple perforations on the surface of a base mat at a controlled depth and density (number of perforations per unit area). Perforating is carried out by pressing a plate equipped with a predetermined number of needles onto a base mat. Fissuring provides indentation of unique shapes onto the surface of a formed base mat with, for example, a roll equipped with a patterned metal plate. Both perforating and fissuring steps open the base mat surface and its internal structure, thereby allowing air to move in and out of the panel. Openings in the base mat also allow sound to enter and be absorbed by the base mat core.

In addition, the acoustical panels are optionally laminated with a scrim or veil. It is also contemplated that the present acoustical panels can be manually cut with a utility knife.

Once formed, the present acoustical panels preferably have a bulk density between about 9 to about 32 lbs/ft$^3$ (144 to 513 kg/m$^3$), more preferably between about 10 to about 27 lbs/ft$^3$ (160 to 433 kg/m$^3$) and most preferably from about 11 to about 22 lbs/ft$^3$ (176 to 352 kg/m$^3$). In addition, the panels preferably have a thickness between about 0.2 inches to 1.5 inches (5 to 38 mm), more preferably between about 0.3 inches to 1.0 inch (8 to 25 mm) and most preferably from about 0.5 inches to about 0.75 inches (13 to 19 mm).

Acoustical panels including at least one renewable component preferably achieve an NRC value of at least about 0.25 and a CAC value of at least about 25. Moreover, the acoustical panels achieve an eNRC value of least about 0.15. In addition, the acoustical panels achieve an MOR value of at least about 80 psi and a hardness value of at least about 100 lbf, while achieving a maximum sag value in a 90% RH humidity chamber of 1.5 inch (38 mm). Still further, the acoustical panels achieve a flame spread index of less than about 25 and a smoke development index of less than about 50. The acoustical panels also have an STC of at least about 25.

EXAMPLE 1

Rice hulls were obtained from Riceland Industries, Jonesborough, Ark., where the rough rice was milled to separate the rice kernel from the rice hull. Rice hulls were classified according to sieve sizes, with sieves of #6 mesh screen, #10 mesh screen (having an opening of 0.066 inches or 1.7 mm), #16 mesh screen (having an opening of 0.039 inches or 1 mm) and #30 mesh screen. The size distribution of the rice hull included about 18.3% retained on the #10 mesh screen, about 58.0% retained on the #16 mesh screen, about 20.1% retained on the #30 mesh screen, while about 3.6% passed through the #30 mesh screen. The bulk density of the rice hull was about 8.51 lbs/ft$^3$ (136 kg/m$^3$).

A slurry having about 4.5% consistency was formed by mixing water with panel ingredients and varying amounts of perlite and rice hulls as described in Table 1. With the water being constantly stirred, the ingredients were added in the following order: newsprint pulp, starch, calcium carbonate, ground rice hull, mineral wool and expanded perlite. The slurry was agitated for about 2 minutes. At the end of agitation, flocculent was added to the slurry in a concentration of about 0.1% by weight of the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm Hg)) to the forming box. The wet base mat was then pressed to a constant wet thickness to remove additional water and also to consolidate the base mat structure. Finally, the wet base mat was further dewatered by applying a higher pressure vacuum (5-9" Hg (127-229 mmHg)). The formed base mat was then dried in an oven or kiln at 315° C. (600° F.) for 30 minutes and 149° C. (300° F.) for 3 hours to remove remaining moisture.

In the following example, about 10% mineral wool by weight of the panel was used, along with about 19% newsprint fibers, about 8% starch and about 6% calcium carbonate. The amounts of perlite and rice hulls are indicated below. Properties of the resultant dried base mats are also listed.

TABLE 1

| Test No. | Perlite, % by wt. | Rice Hull, % by wt. | Mat Thickness, inches (mm) | Density, lbs/ft$^3$ (kg/m$^3$) | MOR, psi (kPa) | Hardness, lb·f (N) | eNRC (unperf.) | Airflow resistivity, mPa·s/m$^2$ |
|---|---|---|---|---|---|---|---|---|
| 1 | 57.0 | 0.0 | 0.637 (16.2) | 13.45 (215.45) | 127 (875.67) | 215 (956.75) | 0.20 | 11.3 |
| 2 | 57.0 | 0.0 | 0.640 (16.26) | 12.99 (208.1) | 102 (703.29) | 203 (1399.69) | 0.18 | 11.1 |
| 3 | 37.1 | 20.0 | 0.679 (17.25) | 13.06 (209.2) | 99 (682.61) | 121 (538.45) | 0.27 | 1.9 |
| 4 | 17.1 | 39.9 | 0.788 (20.02) | 11.04 (176.84) | 52 (358.54) | 48 (213.6) | 0.54 | 0.3 |
| 5 | 0.0 | 57.0 | 0.586 (14.88) | 9.85 (157.78) | 38 (262.01) | 25 (111.25) | 0.69 | 0.0 |

As shown, base mats having a higher percent by weight of rice hulls also have a lower airflow resistivity value, demonstrating that the base mats are more porous. Consequently, base mats including more rice hulls are more acoustically absorbent, which is reflected in the unperforated eNRC value.

As shown, base mats having rice hulls that were able to pass through larger screen openings, are more acoustically absorbent, which is reflected in a higher eNRC value.

EXAMPLE 2

Rice hulls were obtained from Riceland Industries, Jonesborough, Ark., where the rough rice was milled to separate the rice kernel from its hull. The rice hull was further ground with a Fritz mill equipped with a 0.109" (0.028 m) diameter perforated screen size. The rice hulls were ground until all of the materials passed through the screen. Additional rice hulls were ground and separated using screens with openings of 0.079" and 0.050" (0.002 m and 0.0013 m, respectively). The bulk densities of the above samples were about 14.62 lbs/ft$^3$ (234 kg/m$^3$), 16.31 lbs/ft$^3$ (261 kg/m$^3$) and 21.77 lbs/ft$^3$ (349 kg/m$^3$) for the screen openings of 0.109" (0.028 m), 0.079" (0.002 m) and 0.050" (0.0013 m), respectively.

A slurry having about 4.5% consistency was formed by mixing water with panel ingredients and varying amounts of perlite and rice hulls as described in Table 2. With water being constantly stirred, the ingredients were added in the following order: newsprint pulp, starch, calcium carbonate, ground rice hull, mineral wool and expanded perlite. The slurry was agitated for about 2 minutes. At the end of agitation, flocculent in an amount about 0.1% by weight was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mm)) to the forming box. The wet base mat was then pressed to a constant wet thickness to remove additional water and also to consolidate the base mat structure. Finally, the wet base mat was further dewatered by applying a higher pressure vacuum (5-9" Hg (127-229 mmHg). The formed base mat was then dried in an oven or kiln at 315° C. (600° F.) for 30 minutes and 149° C. (300° F.) for 3 hours to remove remaining moisture.

In the Table 2, about 10% mineral wool by weight of the panel was used to form the panel, along with about 19% newsprint fibers, about 8% starch and about 6% calcium carbonate. The amounts of perlite and rice hulls are indicated below. Properties of the resultant dried base mats are also listed.

EXAMPLE 3

Rice hulls were obtained from Rice Hull Specialties, Stuttgart, Ark., where rice hulls from a rice milling plant were ground. The ground rice hulls were first sieved with a #20 mesh screen to remove larger particles, followed by sieving through a #80 mesh screen to remove smaller particles. The ground rice hulls that passed through the #20 mesh screen and were retained on the #80 mesh screen were used to make the base mats. The bulk density was about 22.96 lbs/ft$^3$ (368 kg/m$^3$).

A slurry having about 4.5% consistency was formed by mixing water with panel ingredients and varying amounts of perlite and rice hulls as described in Table 3. With water being constantly stirred, the ingredients were added in the following order: newsprint pulp, starch, calcium carbonate, ground rice hull, mineral wool and expanded perlite. The slurry was agitated for about 2 minutes. At the end of agitation, about 0.1% by weight of the slurry of flocculent was added to the slurry. The slurry was then poured into a forming box having the dimensions 14"×14"×30" (0.36 m×0.36 m×0.76 m).

At the bottom of the forming box, a fiberglass scrim supported by a metal grid allowed the slurry water to drain freely, while retaining most of the solids. Additional water was removed by applying a low pressure vacuum (1" Hg (25 mmHg)) to the forming box. The wet base mat was then pressed to a constant wet thickness to remove additional water and also to consolidate the base mat structure. Finally, the wet base mat was further dewatered by applying a higher pressure vacuum (5-9" Hg (127-229 mmHg). The formed base mat was then dried in an oven or kiln at 315° C. (600° F.) for 30 minutes and 149° C. (300° F.) for 3 hours to remove remaining moisture.

In the Table 3, about 10% mineral wool by weight of the panel was used to form the panel, along with about 19% by weight of the panel newsprint fibers, about 8% by weight of the panel starch and about 6% by weight calcium carbonate. The amounts of perlite and rice hulls are indicated below. Properties of the resultant dried base mats are also listed.

TABLE 2

| Test No. | Screen Opening, inches | Perlite, % by wt. | Rice Hull, % by wt. | Mat Thickness, inches (mm) | Density, lbs/ft$^3$ (kg/m$^3$) | MOR, psi (kPa) | Hardness, lb · f (N) | eNRC (unperf.) | Airflow Resistivity, mPa · s/m$^2$ |
|---|---|---|---|---|---|---|---|---|---|
| 1 | 0.109" | 0.0 | 57.0 | 0.556 (14.1) | 15.26 (244.44) | 114 (786.03) | 83 (3.69) | 0.49 | 0.3 |
| 2 | 0.079" | 0.0 | 57.0 | 0.478 (12.14) | 17.04 (272.95) | 140 (965.3) | 107 (476.15) | 0.46 | 0.3 |
| 3 | 0.050" | 0.0 | 57.0 | 0.375 (9.53) | 22.25 (356.41) | 229 (1578.96) | 229 (1019.05) | 0.40 | 0.9 |

TABLE 3

| Test No. | Perlite, % by wt. | Rice Hull, % by wt. | Mat Thickness, inches (mm) | Density, lbs/ft³ (kg/m³) | MOR, psi (kPa) | Hardness, lb · f (N) | eNRC (unperf.) | Airflow Resistivity, mPa · s/m² |
|---|---|---|---|---|---|---|---|---|
| 1 | 37.1 | 20.0 | 0.602 (15.30) | 13.76 (220.41) | 122 (841.19) | 161 (716.45) | 0.22 | 4.2 |
| 2 | 17.1 | 39.9 | 0.526 (13.36) | 16.02 (256.62) | 133 (917.03) | 167 (743.15) | 0.34 | 1.3 |
| 3 | 0.0 | 57.0 | 0.407 (10.34) | 21.05 (337.19) | 219 (1510.01) | 180 (801) | 0.43 | 0.7 |

All three samples in the example were significantly more porous and acoustically more absorbent than the controls of test numbers 1 and 2 in Example 1.

EXAMPLE 4

Rice hulls were obtained from Rice Hull Specialties, Stuttgart, Ark., where rice hulls from a rice milling plant were ground. The ground rice hulls were first sieved with a #30 mesh screen to remove larger particles, followed by sieving through a #80 mesh screen to remove smaller particles. The ground rice hulls that passed through the #30 mesh screen and were retained on the #80 mesh screen were used to make the base mats. The bulk density was about 28.56 lbs/ft³ (457 kg/m³). A slurry was prepared in a stock chest by mixing water with panel ingredients according to the composition of Table 4:

TABLE 4

| | Newsprint Fiber | Clay | Ground Rice Hull | Starch | Mineral Wool | Expanded Perlite |
|---|---|---|---|---|---|---|
| % by weight of panel | 18.8 | 2.7 | 29.4 | 8.2 | 9.7 | 31.2 |

In addition to the ingredients of Table 4, an additional 20% by weight of the panel of re-claimed acoustical panels (or "broke") was added. Re-claimed acoustical panels are those panels that are defective, off-quality or ground finished products. The re-claimed acoustical panels may or may not be of the same composition.

The consistency of the slurry was about 3.0%. A homogeneous slurry including the ingredients of Table 4 was transported to the head box, which provides a steady flow of slurry material. The slurry flowing out of the head box was then distributed on a foraminous wire to form a wet base mat. Water was first drained from the wire by gravity. Additional water was removed by applying a low vacuum pressure under the wire (4" Hg (100 mm Hg)). After pressing the base mats between two rollers, additional water was removed by applying a relatively high vacuum pressure under the wire (7-15" Hg (178-381 mmHg)). The remaining water and moisture in the wet base mat was evaporated in a kiln.

After drying, the base mats were cut, ground, rolled and sprayed, punched and fissured into aesthetically pleasing acoustical panels that were either 2'×4' (0.61 m×1.22 m) or 2'×2' (0.61 m×0.61 m). Table 5 lists the base mat properties:

TABLE 5

| Test No. | Mat Thickness, inches (mm) | Density, lbs/ft³ (kg/m³) | eNRC (unperf.) | Air-flow Resistivity, mPa · s/m² |
|---|---|---|---|---|
| 1 | 0.617 (15.67) | 12.98 (207.92) | 0.40 | 1.12 |
| 2 | 0.615 (15.62) | 13.00 (208.24) | 0.41 | 1.09 |
| 3 | 0.607 (15.42) | 14.69 (235.31) | 0.33 | 1.68 |
| 4 | 0.614 (15.60) | 15.60 (249.89) | 0.30 | 2.21 |

In addition, Table 6 shows the finished acoustical panel properties:

TABLE 6

| Test No. | Mat Thickness, inches (mm) | Density, lbs/ft³ (kg/m³) | MOR, psi (kPa) | Hardness, lb · f (N) | eNRC (unperf.) | NRC | CAC |
|---|---|---|---|---|---|---|---|
| 5 | 0.586 (14.88) | 14.91 (238.84) | 119 (820.51) | 162 (720.9) | 0.60 | 0.65 | 36 |
| 6 | 0.584 (14.83) | 15.56 (249.25) | 118 (813.61) | 176 (783.2) | 0.58 | 0.65 | 35 |
| 7 | 0.586 (14.88) | 16.55 (265.11) | 138 (951.51) | 216 (961.2) | 0.55 | 0.60 | 37 |
| 8 | 0.582 (14.78) | 17.56 (281.28) | 156 (1075.62) | 259 (1152.55) | 0.49 | 0.55 | 38 |

EXAMPLE 5

Rice hulls were obtained from Rice Hull Specialties, Stuttgart, Ark., where rice hulls from a rice milling plant were ground. The ground rice hulls were first sieved with a #20 mesh screen to remove large particles, followed by sieving through a #80 mesh screen to remove small particles. The ground rice hulls that passed through the #20 mesh screen and were retained on the #80 mesh screen were used to make the base mats. The bulk density was about 24.37 lbs/ft³ (390 kg/m³). A slurry was prepared in a stock chest by mixing water with panel ingredients approximately according to the composition of Table 7:

TABLE 7

| | Newsprint Fiber | Clay | Ground Rice Hull | Starch | Mineral Wool | Expanded Perlite |
|---|---|---|---|---|---|---|
| % by weight of panel | 18 | 3 | 30 | 8 | 9 | 32 |

In addition to the ingredients of Table 7, an additional 15% (by weight of the panels) of broke was added.

The consistency of the slurry was about 3.0%. A homogeneous slurry including the ingredients of Table 7 was transported to head box, which provides a steady flow of slurry material. The slurry flowing out of the head box was then distributed on a foraminous wire to form a wet base mat. Water was first drained from the wire by gravity. Additional water was removed by applying a low vacuum pressure under the wire (1" Hg (25 mm Hg)). After pressing the base mats between two rollers, additional water was removed by applying a relatively high vacuum pressure under the wire (5-9" Hg (127-229 mm Hg). The remaining water and moisture in the wet base mat was evaporated in a kiln.

After drying, the base mats were cut, ground, rolled and sprayed, punched and fissured into aesthetically pleasing acoustical panels that were either 2'×4' (0.61 m×1.22 m) or 2'×2' (0.61 m×0.61 m). Table 8 lists the base mat properties:

TABLE 8

| Test No. | Mat Thickness, inches (mm) | Density, lbs/ft³ (kg/m³) | eNRC (unperf.) |
|---|---|---|---|
| 1 | 0.581 (14.76) | 13.43 (215.28) | 0.36 |

In addition, Table 9 shows the finished acoustical panel properties:

TABLE 9

| Test No. | Mat Thickness, inches (mm) | Density, lbs/ft³ (kg/m³) | MOR, psi (kPa) | Hardness, lb·f (N) | eNRC (unperf.) | NRC | CAC |
|---|---|---|---|---|---|---|---|
| 2 | 0.588 (14.94) | 15.38 (246.36) | 115 (792.93) | 190 (845.5) | 0.52 | 0.60 | 34 |

While particular embodiments of panels for use as building materials that include a renewable component have been shown and described, it will be appreciated by those skilled in the art that changes and modifications may be made thereto without departing from the invention in its broader aspects and as set forth in the following claims.

What is claimed is:

1. A panel for use as a building material comprising:
said panel being formed from an aqueous slurry including an inorganic fiber component, starch, water and a renewable component, about 0.1% to about 95% by weight of the panel, after removal of the water, being of the renewable component; wherein said panel has at least one of a Ceiling Attenuation Class value of at least about 25, a Noise Reduction Coefficient value of at least about 0.25 and a Sound Transmission Class value of at least about 25.

2. The panel of claim 1 wherein said renewable component comprises rice hulls.

3. The panel of claim 1 having an estimated Noise Reduction Coefficient value of at least about 0.20.

4. The panel of claim 1 having an air flow resistivity of less than about 8 mPa·s/m².

5. The panel of claim 1 having an Modulus of Rupture value of at least about 80 psi.

6. The panel of claim 1 having a bulk density between about 7 lbs/ft³ and about 30 lbs/ft³.

7. The panel of claim 1 having a thickness of between about 0.2 inches to about 1.5 inches.

8. The panel of claim 1 that sags less than about 1.5 inches in a 90% RH humidity chamber.

9. The panel of claim 1 having a flame spread index of less than about 25.

10. The panel of claim 1 having a smoke development index of less than about 50.

11. The panel of claim 1 wherein said renewable component includes less than about 5% by weight of particles that are retained by a mesh screen with openings of about 0.312 inches.

12. The panel of claim 1 wherein said renewable component includes less than about 5% by weight of particles that are retained by a mesh screen with openings of about 0.132 inches.

13. The panel of claim 1 wherein said renewable component includes less than about 5% by weight of particles that are retained by a mesh screen with openings of about 0.022 inches.

14. The panel of claim 1 wherein a bulk density of said renewable component is between 5 and 50 lbs/ft³.

15. A panel for use as a building material comprising:
said panel being formed from an aqueous slurry including an inorganic fiber component, starch, water and a renewable component, about 0.1% to about 95% by weight of the panel, after removal of the water, being of the renewable component, the renewable component being reduced in size such that no more than 5% by weight of the renewable component is retained by a mesh screen with openings of about 0.312 inches; wherein said panel has at least one of a Ceiling Attenuation Class value of at least about 25, a Noise Reduction Coefficient value of at least about 0.25 and a Sound Transmission Class value of at least about 25.

* * * * *

UNITED STATES PATENT AND TRADEMARK OFFICE
CERTIFICATE OF CORRECTION

| | | |
|---|---|---|
| PATENT NO. | : 7,935,223 B2 | Page 1 of 1 |
| APPLICATION NO. | : 12/106077 | |
| DATED | : May 3, 2011 | |
| INVENTOR(S) | : Bangji Cao et al. | |

It is certified that error appears in the above-identified patent and that said Letters Patent is hereby corrected as shown below:

Title Page, Item 73

The assignee name should read USG Interiors, Inc., Chicago, IL (US).

Signed and Sealed this
Thirtieth Day of August, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,935,223 B2 | Page 1 of 1 |
| APPLICATION NO. | : 12/106077 | |
| DATED | : May 3, 2011 | |
| INVENTOR(S) | : Cao | |

It is certified that error appears in the above-identified patent and that said Letters Patent is hereby corrected as shown below:

On the Patent Face:

After "(73) Assignee:" please delete "ISG Interiors, Inc." and replace with --USG Interiors, Inc.--.

In the Description:

In col. 2 line 6, delete "cuffing" and replace with --cutting--.

Signed and Sealed this
Third Day of January, 2012

David J. Kappos
*Director of the United States Patent and Trademark Office*